United States Patent Office 3,311,015
Patented Mar. 28, 1967

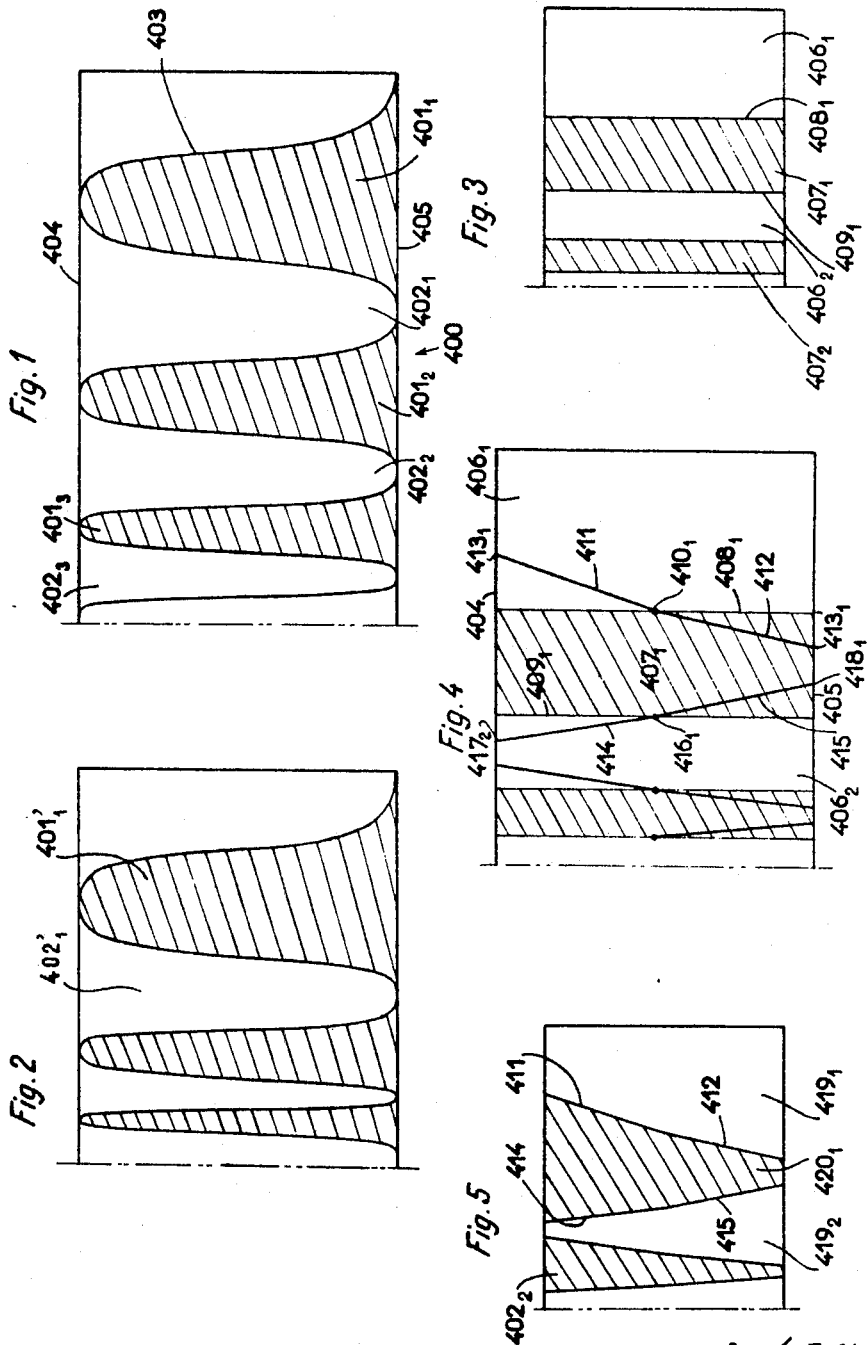

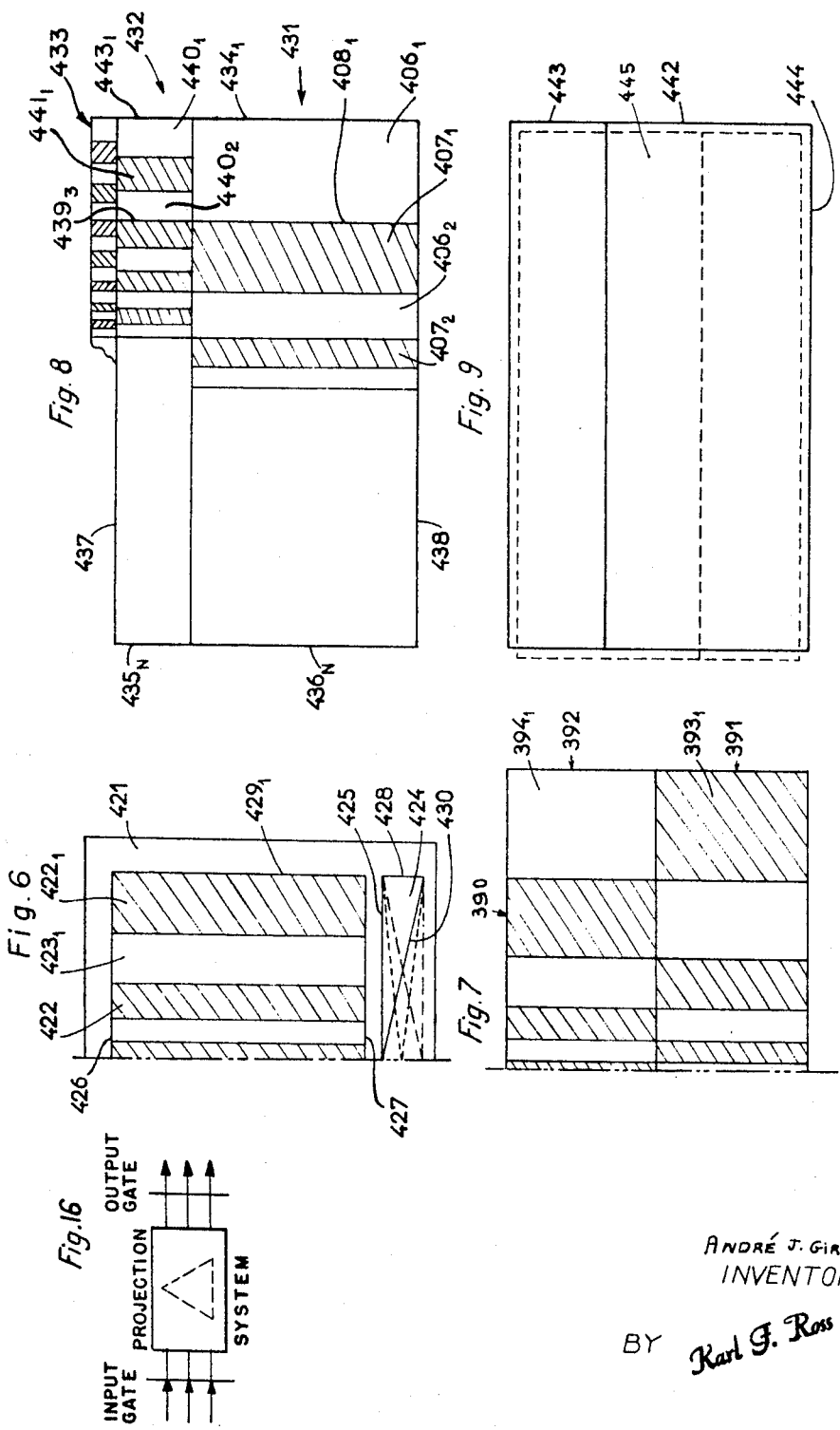

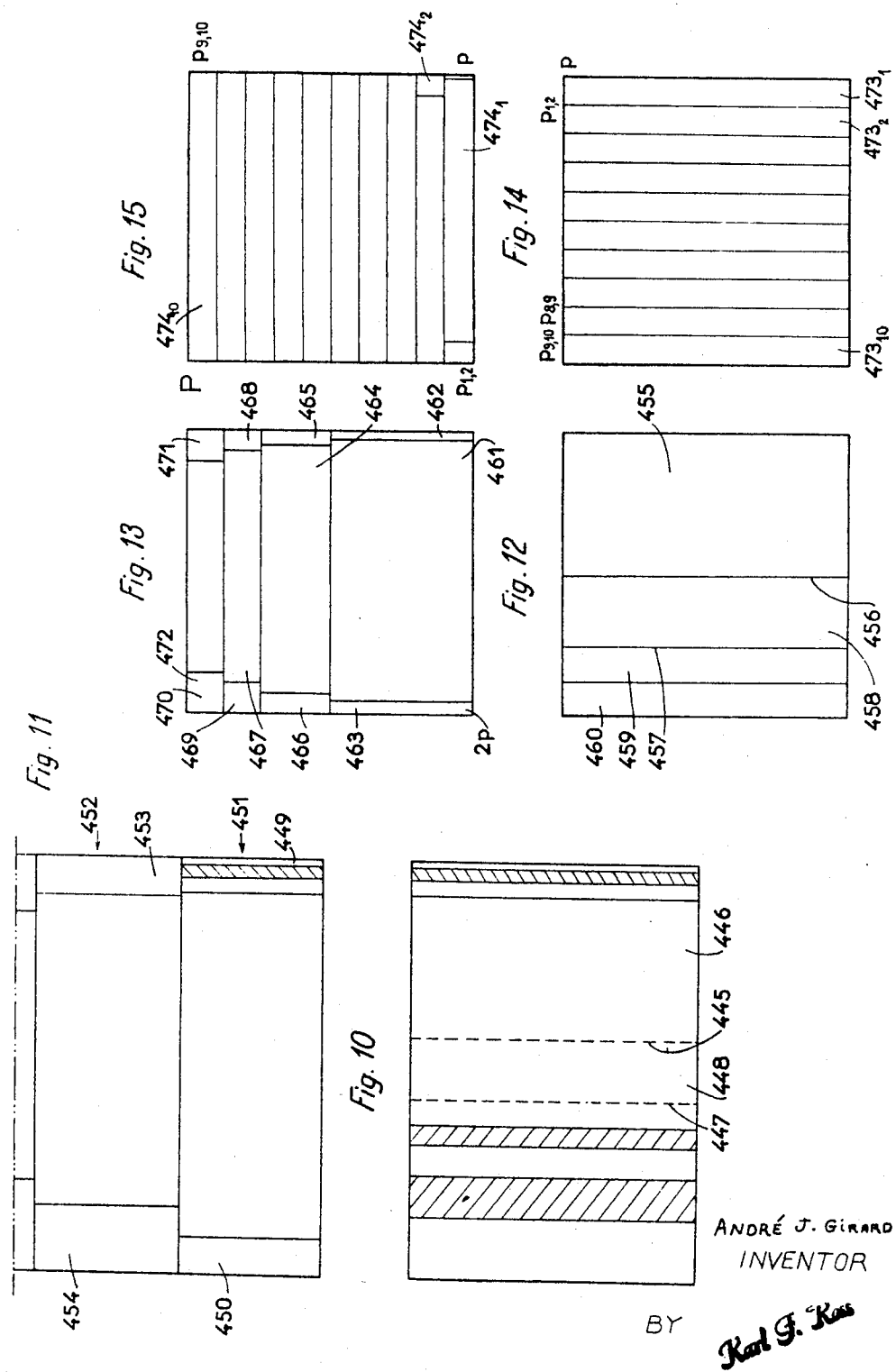

3,311,015
SPECTROMETRIC APPARATUS AND RADIATION GATE THEREFOR
André Jean Girard, Chatillon-sous-Bagneux, Seine, France, assignor to Office National d'Etudes et de Recherches Aerospatiales, Chatillon-sous-Bagneux, Seine, France, a corporation of France
Filed Apr. 11, 1962, Ser. No. 186,812
Claims priority, application France, May 6, 1961, 861,006
16 Claims. (Cl. 88—14)

This application is a continuation-in-part of my co-pending application Ser. No. 31,690, filed May 25, 1960, now U.S. Patent No. 3,211,048.

The invention relates to a spectrometric apparatus in which the radiation flux to be analyzed is treated successively by an input device or gate, a dispersing system such as a prism or diffusion grating, and an output device or gate, wherein the input and output devices each satisfy the general condition of being constituted by two interleaved multiplicities of zones, the zones of one multiplicity differing from those of the other multiplicity in their transmissivity for light beams which respectively impinge upon them, thus constituting a set of passage zones alternating with a set of no-passage zones.

In such a radiation gate, as described in my copending application Ser. No. 31,690, filed May 25, 1960, the said zones form a nonrepetitive pattern in a direction parallel to that of the spread of the spectrum produced by the dispersing system, whereby upon superposition of the two patterns their zones are in coincidence in one relative position so that any one zone of the output device registers with the projected image of a respective zone of the input device only for a reference wavelength corresponding to the setting of the dispersing system. The apparatus also includes means for recording a spectrometric signal by comparison of the radiant energies conveyed by the two sets of light beams delivered by the output device.

In specific embodiments of spectrometric apparatus of this type, as disclosed in my above-identified application any one zone has a constant width parallel to the direction of spreading of the spectrum, get the various zones of each set all differ in width from one another, the total of the areas of the first set being equal to the total of the areas of the second set.

More particularly, the widths of the zones of either set measured in the direction of the spreading of the spectrum, vary progressively in accordance with a non-linear law which is preferably of the hyperbolic type. In the case of a spectrometric apparatus of this type which receives a flux having a single wavelength and in which the zones are straight bands, the input device and the output device thus each constituting a kind of grid, if the position or the condition of the dispersing system is caused to vary, the signal supplied by the spectrometer at its output end remains first at zero constant manner, as long as there is no overlapping between the image of the input element and the output element. Upon incipient coincidence, the signal starts at very low intensity and rises to a maximum value, the energy applied to the receiver being then substantially equal to the energy which passes through whose input element, the image as projected by the apparatus is now superposed upon the output element; the output signal subsequently reverts to very low strength with variations similar to those which preceded its peak value. A similar effect takes place in the case of each wavelength when the incident flux polychromatic, i.e. contains radiation of different wavelengths.

In point of fact, the output signal which is at a maximum for the adjustment wavelength does not pass to zero immediately when the wavelength is varied shifted from its reference value, but is subjected on each side of that value to fluctuations, above and below zero, with peaks whose amplitudes in any case progressively decrease fairly rapidly.

The amplitudes of these secondary peaks may be reduced, both in the input grid and the output grid, by minimizing the effect of the passage and no-passage zones of smallest width. To this end, input and output gates may have contours which, instead of being limited by straight lines parallel or perpendicular to the direction of the bars of the grids, are oblique, at least over a part of their length, with respect to these bars as likewise disclosed in my copending application referred to, so as to define a triangular or trapezoidal shape.

If, in this manner, the maximum amplitudes of fluctuations of the curve representing the output signal are effectively reduced in the immediate vicinity of the adjustment wavelength, without adversely affecting the resolving power of the spectrometer, there still remains, in a spectrometer employing input and output elements of the type mentioned, an output signal which is not always zero when the dispersing system is set for wavelengths which are very different from the wavelength of the incident radiation, this signal fluctuating in such manner that its secondary peaks do not tend toward zero with increasing distance from the adjustment wavelengths; this, naturally, holds only up to the distance at which the image of the input element no longer has any portion thereof in registering with the output element.

Whereas with many applications of the spectrometer no practical disadvantage is found to result therefrom, this phenomenon is troublesome in certain cases, particularly when the incident flux carries energies distributed over a number of wavelengths; substantial errors could thus arise when it is desired to measure the energy which is carried on a specific adjustment wavelength.

The object of the invention is to extend the field of application of the spectrometer by eliminating the disadvantage referred to above, that is to say by making the output signal practically insensitive to the energies carried over wavelengths other than the wavelength corresponding to the setting of the dispersing system, whatever may be the distance at which the other wavelengths are located with respect to the adjustment wavelength. It is a further object of the invention to obtain this result without modifying either the conditions of use of the spectrometer or the general constitution thereof.

A feature of the invention is to replace the straight bars constituting a material grid by passage and no-passage zones bounded by sinusoidal lines.

This feature may be embodied in a radiated gate in which one zone, for example a zone of passage, is followed by a zone of non-passage having the same configuration, thus forming therewith a pair, the sine curve which bounds the two paired zones having a constant pitch differing from that of a sine curve that bounds the two following zones.

In another embodiment the pitch of the sinusoidal bounderies of successive zones of passage and of non-passage varies progressively in accordance with a suitable law designed to provide a desired nonrepetitive pattern in the spectrum-spread direction.

In the description which follows below, and which is given solely by way of illustration but not of limitation, reference is made to the accompanying drawing, in which:

FIG. 1 is a diagrammatic view of an input or output element or gate constituting one embodiment of the invention;

FIG. 2 is similar to FIG. 1, showing an alternative form of gate;

FIG. 3 is a digrammatic view of an input or output element having straight interzonal boundaries;

FIG. 4 is a view of an input element similar to that of the preceding figure but with modification of its boundary lines;

FIG. 5 is a view of the modified gate of FIG. 4, drawn to a smaller scale;

FIG. 6 is a view of an input or output element in accordance with another embodiment;

FIG. 7 is a view of an input or output element, in still another form;

FIG. 8 is a view of an input element representing yet another embodiment;

FIG. 9 illustrates the corresponding output element with the image of the input element of FIG. 8 mirror-symmetrically projected upon it;

FIG. 10 shows a further modification of an input element as illustrated in FIG. 3;

FIG. 11 shows an input or output element obtained by virtue of the modification shown in FIG. 10;

FIG. 12 is similar to FIG. 10 but applies to another modification of the pattern illustrated in FIG. 3;

FIG. 13 shows an input or output element obtained by virtue of the modification shown in FIG. 12;

FIG. 14 is similar to FIG. 12 but applies to a further modification of the basic pattern; and FIG. 15 shows diagrammatically an input or output gate derived from the modification of FIG. 14.

A first embodiment of an input or output element or gate in accordance with the present invention is illustrated in FIG. 1.

In this embodiment, the element is constituted by a plate 400 which comprises opaque zones $401_1$, $401_2$, $401_3$ and transparent zones $402_1$, $402_2$, $403_3$ in alternation with the opaque zones, the boundary between the zones being a line 403 having a sinusoidal shape and undulating between the longitudinal plate edges 404 and 405 which are parallel to the plane of dispersion of the apparatus of which the element 400 forms the input or output gate. The series of opaque zones and the series of transparent zones satisfy certain general conditions, that is to say in particular that the zone $401_1$ has the same area as the zone $402_1$, while the zone $401_2$ has the same area as the zone $402_2$, etc. Upon a shift of the projected image of the input gate relative to the output gate in a direction parallel to the edges 404 and 405, such as takes place when the position of the dispersing system and/or the wavelength of the radiation flux passing through the apparatus is varied, the transmittance along one any branch of the line 403 varies in a sinusoidal manner.

Whereas in the embodiment of FIG. 1 an opaque zone, such as $401_1$ and an adjacent transparent zone, such as $402_1$, constitute a pair of zones of equal areas, I have shown in FIG. 2 a pattern wherein each opaque zone $401'_1$ (or vice versa) having a different area, their areas varying in accordance with the same general law, set forth above, as the areas of the paired zones in FIG. 1.

Such a variation of areas is also applicable in the case of an input or output element of the type disclosed in my aforementioned application in which the boundaries of the zones of passage and of non-passage are straight lines at right angles to the plane of dispersion. An input or output element of this type is shown in FIG. 3. The element comprises a first zone of passage $406_1$ of rectangular shape followed by a zone of non-passage $407_1$ of rectangular shape which is in turn followed by a zone of passage $406_2$, then by a zone of non-passage $407_2$, these zones being defined by straight lines $408_1$ and $409_1$ which are parallel to each other and perpendicular to the plane of dispersion, the widths of the different zones being all different from one another. More specifically the width of the various spaces may be governed by the law $i=k/x$, in which $i$ is the width of a zone, $k$ is a constant and $x$ is the distance from the zone to the remote edge of the widest zone.

Reference will now be made to FIGS. 4 and 5. In order to construct the embodiment shown in FIG. 5, which is an alternative form of that shown in FIG. 2, the element FIG. 3 is employed as shown in FIG. 4. Two straight lines 411 and 412 are then drawn from the center $410_1$ of the transverse line $408_1$ to points $413_1$ and $413'_1$ on the edges 404 and 405, these points being located at one-third of the width of the band $406_1$ and of the band $407_1$, respectively starting from the extremities of the straight line $408_1$. Similarly, straight lines 414 and 415 are drawn so as to join the center $416_1$ of the side $409_1$ to the points $417_2$ and $418_1$ located at one-third of the width of the intervals $407_1$ and $406_2$ adjacent the transverse line $409_1$, and so on, to establish a new set of oblique, geniculate interzonal boundaries etc. There are thus defined (as shown in FIG. 5) zones of passage $419_1$, $419_2$ and zones of non-passage $420_1$, $420_2$ separated by the sides 411, 412 and 414, 415 etc., these zones being bounded by straight sides of simplified outline whose general shape is an approximation of that of the zones of the embodiments shown in FIGS. 1 and 2 (the illustrations given in FIGS. 4 and 5 as well as in other figures of the drawing has only an explanatory purpose and must not be considered as a faithful enlargement of an actual element).

With input and output elements whose patterns do not include pairs of zones of different transmissivity having the same width or the same surface area, the total surface area of the zones of non-passage being greater than that of the zones of passage, it is intended in accordance with the present invention to arrange a complementary zone of passage whose area complements that of the zones of passage of the pattern to satisfy another general requirement, namely the quality of the areas of the combined zones of passage and of the zones of non-passage. An input element of this type is shown diagrammatically in FIG. 6. The plate 421, which bears a grid pattern composed of interleaved zones of non-passage 422 and zones of passage 423, all of unequal widths, comprises a complementary zone of passage 424, whose dimension in the direction of the succession of zones is equal to several times the width of the widest zone. In the arrangement which has been illustrated, the complementary zone 424 is a right triangle defined by a long leg 425 which is parallel to the edges 426 and 427 and by a short leg 428 in line with the outer edge $429_1$ of the zone $422_1$, the hypotenuse of the triangular zone being indicated at 430.

This, the said complementary zone, while retaining a triangular shape in which the short side forms an extension of the edge $429_1$, may also have its other sides disposed in a different manner; for example, have the shape of an isosceles triangle or of a right triangle mirror-symmetrical to that shown in full lines, these two alternative forms being shown in broken lines in FIG. 6.

In the alternative form shown in FIG. 7, the equality of the zones of passage and the zones of non-passage is obtained by virtue of the fact that the grid 390 is divided into two equal parts 391 and 392, the part 391 comprising a succession of zones of passage and zones of non-passage having straight edges, their widths varying from one zone to the other, the portion 392 being constituted in geometrically identical manner but inversion of transmissivity so that a zone of non-passage, such as zone $393_1$ of the portion 391 is juxtaposed with a zone of passage of portion 392 having the same area, such as the zone $394_1$, etc.

Reference will now be made to FIG. 8. In this embodiment, the input element comprises two portions: a portion 431 which can be called the principal portion, and a portion 432 which can be called the auxiliary or compensation portion. The principal portion is constituted, for example, by a straight-line pattern such as that shown in FIG. 3 and described above. The auxiliary portion 432 is continguous to and either above or beneath the principal portion 431, the edge $443_1$ of this auxiliary portion forming an extension of the edge $434_1$ whereas the opposite edge $435_N$ of the auxiliary portion forms an extension of the edge $436_N$ of the principal portion. The outer edges 437 and 438 of the input element are parallel. The compensation portion 432 comprises, as does the principal portion, a succession of zones of passage alternating with zones of non-passage. In order to mark the bars which constitute the complementary portion 432, the method of operation is as follows: the side $408_1$ bounding the first zone of passage $406_1$ is extended along the side $439_3$ and that surface of the complementary portion which is confined between the side $443_1$ and the side $439_3$ is divided into three successive zones alternately of passage and non-passage, in accordance with the same law as that which governs the succession of zones of passage and zones of non-passage of the principal portion. There is thus obtained in succession a zone of passage $440_1$, a zone of non-passage $441_1$ and a zone of passage $440_2$. The same procedure is adopted in the case of each of the surfaces of the complementary portion opposite a zone of non-passage or a zone of passage of the principal portion.

The output element is constituted in a manner similar to the input element: it has a principal portion 442 which comprises, for example, a succession of zones of passage and zones of non-passage disposed in a manner similar to the zones of the principal portion 431 of the input element, and also has a complementary portion 443 comprising a succession of zones of passage and zones of non-passage having an arrangement similar to that of the complementary portion 432 of the input element. Moreover, the output element is disposed in such manner that, for the adjustment wavelength, there is a superposition of the peripheral contour of the output element with the image of the input element as projected by the apparatus, the image of the complementary portion of the input element being bordered, however, by the outer edge 444 of the principal portion of the output element, while the images of the zones of passage and of non-passage of the input element in the central portion 445 are superimposed on the zones of passage and of non-passage of the central portion of the output element. The position of the overall image of the input element is shown in a broken outline which has been slightly displaced, for the purpose of clearer illustration, with respect to the full line representing the circumference of the output element.

It has been observed that, in the case of input and output elements constituted as defined in the foregoing designation, the secondary peaks referred to above are much less substantial than in the case of input and output grids having single rows of bars.

This result can be improved still further by juxtaposing with a principal grid portion, not only a complementary portion having a number of zones of passage and non-passage three times as great as the principal portion, as disclosed with reference to FIGS. 8 and 9, but also a second supplemental portion having a number of passages and zones of non-passage five times as great, the latter series of zones conforming to the same law as that which governs the succession of zones of passage and zones of non-passage of the principal portion.

A first mode of execution of an input element of this type is defined in the following manner: a grid is employed which is constituted in accordance with FIG. 3 referred to above and as shown in FIG. 10. If $p$ is the width of the narrowest spacing, there can be seen by means of the line 445 which is parallel to the bars and marked on the grid the location at which the width is equal to a pre-determined value, namely less than $3p$, for example $2.5p$; a first portion 446 is thus limited. A second line 447 is subsequently marked parallel to the bars at the place in the grid in which the width of the bars is in the same ratio with respect to the width in the zone 443 as the width of this latter with respect to the marginal width, thereby distinguishing a second portion 448; in the previous example the width on the line 447 will be $2.5 \times 2.5p = 6.25p$, and so forth.

Reference being made to FIG. 11, there is now marked a first row of bars 451, the length of which is equal to the length of the initial grid, the narrowest band 449 of the said first row having the width $p$ while the widest band 450 has the width $2.5p$, the variation in width between these two values complying with a law of the same form as that of the initial grid, the height of the said row being such that the surface of the said row is equal to the surface of the portion 446. With this row 451 there is juxtaposed a row 452 having the same length and constituted by a succession of zones of passage and zones of non-passage, the zone of passage having a width equal to $2.5p$ and designated by the reference 453 being adjacent to the zone 449, while the zone of the other extremity having the reference 454, and the width of which is $6.25p$, being adjacent to the zone 450, the surface of the row 452 being equal to that of the portion 448, etc.

There is thus constituted an input element resulting from the juxtaposition of the rows 451, 452, etc., the resolving power of which is as great as that of the starting grid, and characterized in this respect by the width $p$ of the narrowest zone of passage, the luminosity of which is as great as that of the said grid and which is practically exempt from the defect referred to above which arises from the existence of maximum secondary fluctuations.

Reference will now be made to FIGS. 12 and 13. The starting grid shown in FIG. 12 has zones of passage and zones of non-passage, the widths of which comply with the law referred to above $i = k/x$. This grid is divided into a first portion 455, the narrowest zone of which has the width $p$ and the widest zone of which has a width smaller than $3p$, for example $2p$, the limit 456 of the said zone being located half-way along the length of the grid. The remaining length is divided in two by the line 457, at the level of which the width is $4p$, the area of the portion 458 which is thus limited being one-half the area of the portion 455, and so forth; the area of the following portion 459 is one-half the area of the portion 458 and is limited at its edge opposite to the portion 458 by a zone having a width $8p$; the area of the last portion 460 has an internal zone whose width is equal to $8p$ and an external zone whose width is equal to $16p$. The input element has the same surface area as the starting grid which has just been described. The said input element comprises a first horizontal row 461 having a surface area equal to one-half that of the starting grid and comprising a succession of vertical zones of passage and zones of non-passage, the lengths of which correspond to the hyperbolic law referred to above; the narrowest spacing 462 has the width $p$ and the widest spacing has the width $2p$; located next to and beneath the row 461 is a row 464 having one-half the height and comprising a succession of zones of passage and zones of non-passage which also correspond to a hyperbolic law; the narrow zone of passage 465 has a width substantially equal to $2p$ and the opposite zone 466 of the row has a width equal to $4p$. The following row 467 has a height which is one-half that of the row 464; the widths of the end zones 468 and 469 of the said row 467 are respectively $4p$ and $8p$. The height of the last row 470 is one-half the height of the row 467; the end zones have widths of $8p$ in the case of the zone 471 and $16p$ in the case of the zone 472.

Reference will now be made below to FIGS. 14 and 15 with respect to an alternative form. In this alternative form, the initial grid is divided by straight lines at right angles to the direction of spreading of the spectrum into a certain number of equal portions and this number is chosen so that in each of these portions, the width of the end-zones are in a ratio less than three. There has thus been shown in FIG. 14 a square grid divided for example into ten equal portions $473_1$–$473_{10}$; the width of the zones $p_{1,2}$ at the limit between the portions $473_1$ and $473_2$ is less than three times the width $p$ of the narrowest zone, etc., and the width $p_{9,10}$ at the other extremity of the grid is less than three times the width $p_{8,9}$ at the junction between the portions $473_9$ and $473_{10}$. The final grid shown in FIG. 15 comprises rows $474_1$ to $474_{10}$ of equal heights; the row $474_1$ has a length which is that of the initial grid, a height equal to one-tenth, in the example, of the height of the initial grid; and the said row $474_1$ comprises a succession of zones of passage and zones of non-passage corresponding to the hyperbolic law employed for the definition of the zones of passage and non-passage of the starting grid, one of the end zones of the row having the width $p$ and the other end zone having the width $p_{1,2}$. Located next to and above the said row is a row $474_2$ which has the same width and the same height as the row $474_1$, and is constituted by a succession of zones of passage and of non-passage corresponding to the said law, the zone located above the zone having a width $p$ of the row $474_1$ having the width $p_{1,2}$ and the zone located at the other end having the width $p_{2,3}$, etc. A grid is thus constituted which has the same dimensions as the initial grid, and which has the same end widths as the end widths of the initial grid, the variation in widths complying with the same law as for the said initial grid, and which does not have in the same row any zones having widths in a ratio equal to or greater than 3. A spectrometer comprising a grid of this type as a form of input element and a grid constructed in a similar manner as a form of output element has the same resolving power and the same luminosity as an apparatus which comprises the initial grid shown in FIG. 14 and is exempt from certain defects which characterize this latter.

The invention also makes provision for grids constructed as indicated above, but starting from initial grids in which the widths of the zones of passage and the zones of non-passage vary in accordance with a law which is different from the hyperbolic law.

In the forms of embodiment of input elements and output elements comprising a number of rows as described in the foregoing, it is possible to reduce the fluctuations in the vicinity of the setting wavelength by reducing the heights of the rows comprising those zones which have the smallest widths with respect to the heights of the rows comprising those zones which have the greatest widths.

In the forms of embodiment of grids having straight bars as described above, the bars are directed at right angles to the plane of dispersion. The invention contemplates alternative forms in which the said bars, while being transverse with respect to the said plane, would not be at right angles to this latter. These bars can be in a single direction only or in a number of directions and can be arranged, for example, so as to be symmetrical with respect to the plane of dispersion.

The invention further contemplates a form of embodiment of a grid in which the passing from one zone to the other from the point of view of transmittance is not sudden but takes place with a certain progressivity. This is achieved, for example, by forming an output grid from an image of the input grid having a certain unsharpness, as in photography with purposely imperfect focussing.

The invention provides for an arrangement of a spectrometric apparatus in which the input device is constituted by two identical grids which are either adjacent or in a very close proximity to each other in the direction at right angles to the direction of spreading of the spectrum, and the output device is constituted by two grids which are superimposed on the respective images of the input grids in monochromatic light, but the corresponding zones of which have different directing effects, so that the two output grids can thus be considered as complementary.

What I claim is:

1. A device adapted for use as a radiation gate in spectrometric apparatus having a pair of such gates disposed at the input and the output, respectively, of a projection system which includes dispersion means adjustable to cast upon the output gate the image of the input gate as projected with a predetermined wavelength of incident radiation; said device comprising a supporting plate bearing a generally rectangular pattern which is nonrepetitive in longitudinal direction and composed of a multiplicity of radiation-controlling zones adjoining one another in at least one row extending longitudinally of the rectangle, said zones belonging alternately to a first and a second series of zones of respectively high and low transmissivity for impinging radiation, the distribution of said zones along one longitudinal edge of the pattern being different from their distribution along the opposite longitudinal edge.

2. A device adapted for use as a radiation gate in spectrometric apparatus having a pair of such gates disposed at the input and the output, respectively, of a projection system which includes dispersion means adjustable to cast upon the output gate the image of the input gate as projected with a predetermined wavelength of incident radiation; said device comprising a supporting plate bearing a generally rectangular pattern composed of a multiplicity of radiation-controlling zones adjoining one another in a row extending longitudinally of the rectangle, said zones belonging alternately to a first and a second series of zones of respectively high and low transmissivity for impinging radiation and of widths decreasing progressively within each series, the boundaries of said zones converging alternately toward opposite longitudinal edges of the pattern.

3. A device as defined in claim 2 wherein said boundaries are part of a continuous curve of at least roughly sinusoidal configuration.

4. A device as defined in claim 3 wherein said curve is composed of geniculate branches extending obliquely from one of said longitudinal edges to the other.

5. A device as defined in claim 2 wherein said boundaries are part of a sine curve whose peaks are tangent to said longitudinal edges.

6. A device as defined in claim 5 wherein said sine curve is composed of sections defining pairs of adjacent zones of different transmissivity but equal area, the areas of successive zone pairs decreasing progressively.

7. A device as defined in claim 5 wherein said sine curve is composed of sections of progressively increasing pitch defining progressively narrower zones of high and low transmissivity.

8. A device adapted for use as a radiation gate in spectrometric apparatus having a pair of such gates disposed at the input and the output, respectively, of a projection system which includes dispersion means adjustable to cast upon the output gate the image of the input gate as projected with a predetermined wavelength of incident radiation; said device comprising a supporting plate bearing a generally rectangular pattern composed of a multiplicity of radiation-controlling zones adjoining one another in a plurality of parallel and coextensive rows extending longitudinally of the rectangle, said zones belonging alternately to a first and a second series of respectively high and low transmissivity for impinging radiation and of progressively decreasing widths within each row, the distribution of said zones in one row being different from that in any other row.

9. A device as defined in claim 8 wherein the number of zones in one row is an odd multiple of the number of zones in an adjacent row.

10. A device as defined in claim 9 wherein the row with the smallest number of zones has the greatest width.

11. A device as defined in claim 8 wherein the width ratio between the widest and the narrowest zone is the same for all said rows.

12. A device as defined in claim 11 wherein said width ratio is at most equal to three.

13. A device as defined in claim 8 wherein the number of said rows is two, said rows being of like width and having their first and second zones relatively staggered whereby a zone of low transmissivity of one row lies adjacent a coextensive zone of high transmissivity of the other row.

14. A spectrometric apparatus having a pair of radiation gates disposed at the input and the output, respectively, of a projection system which includes dispersion means adjustable to cast upon the output gate the image of the input gate as projected with a predetermined wavelength of incident radiation; each of said gates comprising a supporting plate bearing a generally rectangular pattern which is nonrepetitive in longitudinal direction and composed of a multiplicity of radiation-controlling zones adjoining one another in at least one row extending longitudinally of the rectangle, said zones belonging alternately to a first and a second series of zones of respectively high and low transmissivity for impinging radiation, the distribution of said zones along one longitudinal edge of the pattern being different from their distribution along the opposite longitudinal edge, the pattern of said input gate being geometrically similar to that of said output gate and so dimensioned that its image as projected by said system is coextensive with the pattern of said output gate.

15. A spectrometric apparatus having a pair of radiation gates disposed at the input and the output, respectively, of a projection system which includes dispersion means adjustable to cast upon the output gate the image of the input gate as projected with a predetermined wavelength of incident radiation; each of said gates comprising a supporting plate bearing a generally rectangular pattern which is nonrepetitive in longitudinal direction and composed of a multiplicity of radiation-controlling zones adjoining one another in at least one row extending longitudinally of the rectangle, said zones belonging alternately to a first and a second series of zones of respectively high and low transmissivity for impinging radiation, the distribution of said zones along one longitudinal edge of the pattern being different from their distribution along the opposite longitudinal edge, the pattern of said input gate being geometrically similar to that of said output gate and so dimensioned that its image as projected by said system is coextensive with the pattern of said output gate and mirror symmetrical with reference thereto.

16. An apparatus as defined in claim 15 wherein the zones of each gate are arranged in a plurality of coextensive rows including a principal row of relatively large width and at least one supplemental row of relatively small width, the projected image of the principal row of said input gate overlapping in width the principal row of said output gate.

References Cited by the Examiner

UNITED STATES PATENTS 1,792,046   2/1931   Skaupy _____ 88—14

OTHER REFERENCES

Girard: "Nouveaux Dispositifs de Spectroscopie a Grande Luminosite," Optica Acta, volume 7, No. 1, January 1960 pp. 81–97.

JEWELL H. PEDERSON, *Primary Examiner.*

R. L. WIBERT, *Assistant Examiner.*